United States Patent [19]

Baumann et al.

[11] 3,761,002

[45] Sept. 25, 1973

[54] FLUID BEARING HAVING DISCRETE HOLES FORMED BY VORTEX RESTRICTORS

[75] Inventors: Gerald W. Baumann; Jay L. Groom, Jr., both of Longmont; Gerald B. Lammers, Boulder, all of Colo.

[73] Assignee: International Business Machines Corporation, Armonk, N.Y.

[22] Filed: Nov. 15, 1972

[21] Appl. No.: 306,659

[52] U.S. Cl. .......... 226/97
[51] Int. Cl. .......... B65h 17/32
[58] Field of Search .......... 226/7, 97

[56] References Cited

UNITED STATES PATENTS

| | | | |
|---|---|---|---|
| 3,347,437 | 10/1967 | Rush | 226/97 X |
| 3,424,359 | 1/1969 | Houle | 226/97 |
| 3,485,429 | 12/1969 | Hutzenlaub | 226/97 |

*Primary Examiner*—Richard A. Schacher
*Attorney*—Francis A. Sirr et al.

[57] ABSTRACT

A thin foil of magnetic recording tape is accurately supported on a cushion of air adjacent a fixed-position reference surface. The reference surface includes a plurality of discrete holes through which air issues under pressure to form an air layer which supports the tape. These discrete holes are formed by the outlet openings of vortex restrictors.

7 Claims, 6 Drawing Figures

FLUID BEARING HAVING DISCRETE HOLES FORMED BY VORTEX RESTRICTORS

BACKGROUND AND SUMMARY OF THE INVENTION

This invention relates to the field of advancing material of indeterminate length, and particularly to the support of such material by fluid. More specifically, this invention relates to the construction of a fluid or air bearing adapted to fluid-support a thin foil, for example, a moving web of magnetic recording tape which carries machine convertible information in the form of the tape's states of magnetization.

Prior art air bearings provide structures wherein air, usually under constant pressure, leaves the reference surface or face of the bearing to create a layer of air between the tape and the reference surface. This layer of air is at a pressure greater than the pressure of the surrounding ambient air. The reference surface is formed of a porous material, or perhaps of a solid material having a pattern of small air-flow holes or slots cut therein.

These prior art air bearings are usually designed to operate in a region of maximum bearing stiffness, the term stiffness being defined as the ratio of tape tension variation to the resulting variation in separation of the tape and the adjacent bearing reference surface. When design requirements dictate a small separation, and/or increased bearing stiffness, it is generally necessary to reduce the size of the above-mentioned air-flow holes. In high performance tape transports, wherein the tape experiences high acceleration with correspondingly high tension transients, the required hole size becomes very small, for example 0.008 inch diameter, or less. A hole of this size is not only difficult to manufacture, but it is also susceptible to clogging by air and/or tape carried contaminates.

Attempts have been made to eliminate the manufacturing problem by reducing the thickness of the reference surface through which these small holes must be drilled. However, this thin-shell reference surface no longer is a stable reference for the air bearing due to its flexibility.

The present invention provides an air bearing having identical bearing characteristics to those prior art bearings which require small size holes; however, the structure of the present invention avoids the manufacturing problems associated with these prior art air bearings, while at the same time eliminating the tendency to clog. The present invention accomplishes this end result by the use of vortex restrictors, and the known characteristic of such restrictors whereby the same resistance to air flow can be provided by using a vortex restrictor with a relatively large hole.

More specifically, the present invention provides an air bearing wherein the air-flow holes in the bearing's reference surface are formed by the outlet openings of vortex restrictors which have the same air-flow characteristics as the small prior art air bearing holes, but in fact provides a much larger hole which is not susceptible to clogging.

In addition, the present invention makes unusual use of the known characteristic of the vortex restrictor, namely, the ability of the vortex restrictor to change its flow resistance with changes in flow rate. This characteristic permits the pressure in the air film to adjust to whatever pressure is needed to support the tape tension.

The present invention provides an inexpensive means of forming an air bearing having a thin air film and/or high stiffness, and does so in a manner to avoid the manufacturing and operational problems of prior art devices.

The foregoing and other features and advantages of the invention will be apparent from the following more particular description of preferred embodiments of the invention, as illustrated in the accompanying drawing.

DESCRIPTION OF THE PREFERRED EMBODIMENT

Figures 1, 2, 3:
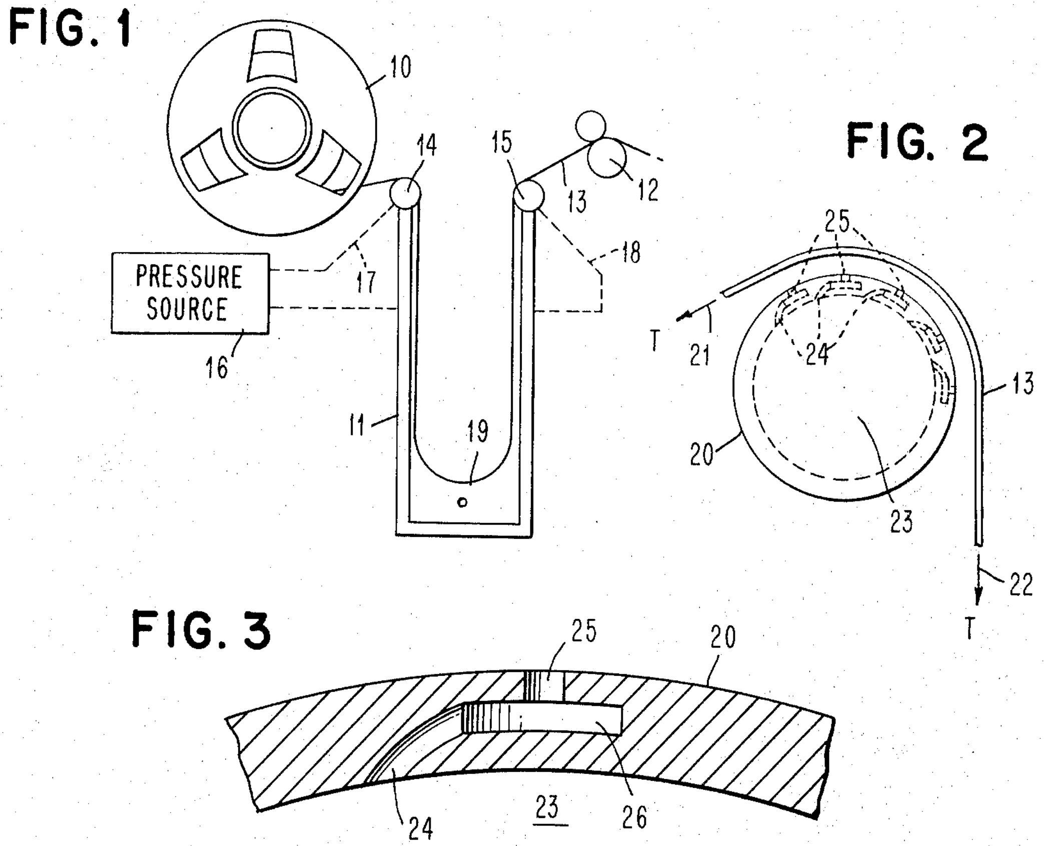
FIG. 1 is a diagrammatic showing of a portion of a magnetic tape unit, including a tape storage reel, a vacuum column buffer for storing a variable length loop of tape, a capstan, and two air bearings embodying the present invention.
FIG. 2 is an end view of a cylindrical air bearing embodying the present invention, showing a length of magnetic tape supported in spaced relationship to the reference surface thereof, and showing an individual vortex restrictor associated with each of the holes of the air bearing.
FIG. 3 is a greatly enlarged view of one air-bearing hole/vortex restrictor of FIG. 2.

FIG. 1 discloses a portion of a magnetic tape unit including tape storage reel 10, vacuum column 11, capstan 12, magnetic recording tape 13, and two air bearings 14 and 15 which embody the present invention. The multiple air-bearing system of FIG. 1 is supplied from a single air-pressure source 16, the connection of source 16 to individual bearings 14 and 15 being represented by broken lines 17 and 18. As is well known, tape 13 experiences rapid dynamic reversals of direction under the control of capstan 12. Tape loop position sensing means, not shown, associated with vacuum column 11, controls the speed and direction of rotation of tape reel 10 to maintain tape loop 19 at an optimum position within the vacuum column. Thus, the tape is subject to forces created by movement of reel 10 and by capstan 12, as well as by the vacuum forces within the vacuum column. The tape path of a conventional magnetic tape unit includes elements such as the magnetic transducer head and the tape cleaner. These elements produce changes in tape tension as the tape passes through this tape path. Air bearings on opposite sides of these elements experience different tape tensions, and as the tape direction changes, the tension in the tape over the bearings changes. While pressure source 16 has been described as a constant pressure source, this recitation does not preclude the changing of pressure magnitude as the tape direction changes, or perhaps as the tape speed changes, as in the high speed rewind of the tape. This invention contemplates that the pressure magnitude of source 16 remains constant during a given mode of operation of the tape unit, that is, for example, during movement of the tape in a forward direction at the normal data processing tape speed. Furthermore, the present invention is not to be limited to a particular configuration of magnetic tape 13 since the present invention is equally applicable to narrow one-half inch tape or relatively wide tape exceeding three inches.

FIG. 2 is an end view of a cylindrical air bearing such as bearings 14 and 15 of FIG. 1, showing a length of tape 13 supported in spaced relation to the bearings reference surface 20. Arrows 21 and 22, designated T, represent the tension in tape 13 tending to force the tape against the bearing's reference surface.

This air bearing includes plenum chamber 23, which is connected to pressure source 16, and supplies high pressure air to inlet openings 24 of a plurality of vortex restrictors whose outlet openings 25 constitute the air-flow openings in the reference surface of the air bearing. An essential feature of the present invention is that outlet openings 25 supply fluid directly to reference surface 20. That is, no restriction-to-flow exists between openings 25 and the fluid film which supports tape 13. Preferably, outlet openings 25 are contiguous with surface 20. However, the present invention does not preclude a pool type bearing wherein openings 25 are connected to surface 20 by means of large, non-restricting holes or pockets.

Within the teachings of this invention, the surface hole pattern in reference surface 20 may take many configurations. A usual hole configuration includes two parallel lines of holes, each line being parallel to an edge of the tape and being inwardly spaced from that edge. Additionally, at both the tape's entrance and exit from the air bearing, a line of holes extends transversely across the width of the tape, normal to its direction of travel.

The essence of the present invention is the provision of vortex restrictors whose outlet openings constitute the air-flow holes in the air bearing's reference surface, such that these air-flow holes are physically quite large, and thus not readily susceptible to clogging. In addition, the vortex restrictor automatically regulates or controls the pressure at the air-bearing hole as a function of tape tension.

Figure 5:
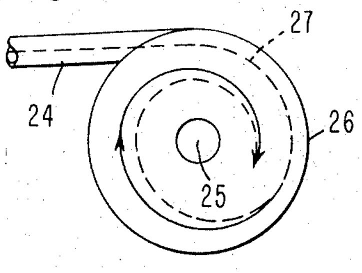
FIG. 5 is a top view of the vortex restrictor of FIG. 3.
Figure 6:
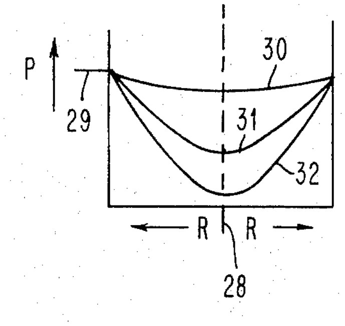
FIG. 6 is a graph showing the air pressure variation as it exists in the vortex restrictor of FIG. 5, and showing a family of three pressure curves which exist for three different tape tensions.

FIG. 3 is a greatly enlarged view of one of these air-bearing holes and shows more clearly the communication of inlet opening 24 with pressure chamber 23, whereby air under pressure is admitted to vortex chamber 26 and exits out of centrally located outlet opening 25. A top view of this vortex restrictor is shown in FIG. 5, wherein vortex shaped air-flow path 27 depicts the manner in which air flows in a circular path in vortex chamber 26. The graph of FIG. 6 shows the pressure variation which exists across the diameter of vortex chamber 26. Coordinate 28 of this graph represents the physical position of outlet hole 25. The legend R and the associated arrow indicate increasing radial distance from the center of the vortex chamber. Pressure coordinate 29 is established by the pressure within chamber 23. This graph shows three curves 30, 31 and 32. Curve 32 represents the pressure profile across the diameter of vortex chamber 26 for a low magnitude tape tension. Curves 31 and 30 are similar profiles for progressively increasing magnitudes of tape tension. From this graph, it can be seen that the pressure at outlet opening 25 is automatically regulated or controlled in accordance with the magnitude of tape tension.

Figure 4:
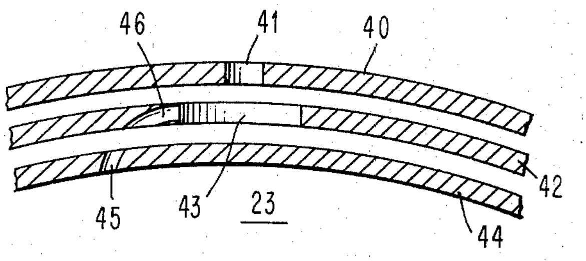
FIG. 4 is an exploded view similar to FIG. 3 and showing an embodiment wherein the air-bearing hole/-vortex restrictor is formed of three layers.

FIG. 4 is an exploded view, similar to FIG. 3, showing an embodiment of the present invention wherein the air bearing includes a relatively thick rigid metal member 40 which includes the outlet opening 41 of the vortex restrictor. Immediately thereunder is a flexible plastic sheet 42 which includes the vortex chamber 43 of the vortex restrictor. Underlying sheet 42 is a similar flexible sheet 44 which seals the bottom of vortex chamber 43 and includes an inlet opening 45 connecting to the inlet opening 46 in sheet 42.

By way of a specific example, the pressure in chamber 23 may be in the range of 85 inches of water, vortex chamber 26 may be 0.075 inch in diameter, and outlet hole 25 may be 0.016 inch in diameter.

While a preferred structural configuration of the invention has been shown, it is to be understood that the invention is not to be limited to the details thereof. For example, the invention finds utility in an air bearing whose reference surface lies in a flat plane, rather than curved, as shown. In addition, the present invention contemplates the use of two or more series-connected vortex restrictors supplying the air flow hole of an air bearing.

While the invention has been particularly shown and described with reference to a preferred embodiment thereof, it will be understood by those skilled in the art that various changes in form and details may be made therein without departing from the spirit and scope of the invention.

What is claimed is: 14

1. A fluid bearing for use in supporting a flexible member at a predetermined position, the bearing comprising:

a fixed-position wall defining a reference surface from which the member is to be supported on a fluid film;

at least one vortex restrictor mounted in said wall such that its outlet opening is adapted to supply fluid directly to the reference surface; and a constant pressure source of fluid connected to the inlet of said restrictor.

2. A fluid bearing as defined in claim 1 wherein said flexible member is a foil and wherein the wall of said vortex restrictor which contains said outlet opening is contiguous with said fixed-position wall.

3. A fluid bearing as defined in claim 2 including a plurality of vortex restrictors mounted in said wall such that the outlet openings thereof form a hole pattern in said reference surface, and wherein said source of fluid is connected in parallel to the inlet openings of all of said restrictors.

4. A fluid bearing as defined in claim 3 wherein said fixed-position wall includes an intermediate portion which includes a plurality of vortex chambers communicating with said outlet openings; and a surface opposite said reference surface which forms one wall of a plenum chamber and includes a plurality of inlet openings, one for each of said restrictors.

5. In combination:

a length of web subjected to variable tension therein, a fixed-position wall defining a reference surface from which said web is to be supported on a fluid film;

at least one vortex restrictor mounted in said wall such that its outlet opening supplies fluid directly to the reference surface; and a constant pressure source of fluid connected to the inlet of said restrictor, such that a variable air film pressure is developed at said outlet opening in accordance with the variable tension in the web.

6. The combination defined in claim 5 wherein a plurality of vortex restrictors are mounted in said wall such that the outlet openings thereof form a desired hole pattern in said reference surface.

7. The combination defined in claim 6 wherein the outlet opening of all of said vortex restrictors is contiguous with said fixed-position wall.

* * * * *